(12) United States Patent
Lees et al.

(10) Patent No.: US 9,351,096 B2
(45) Date of Patent: *May 24, 2016

(54) WIRELESSLY COMMUNICATING WITH VEHICLE CONVERTERS

(71) Applicant: V Track ID Inc., Durham, NC (US)

(72) Inventors: Robert Lees, Surrey (GB); Bruce B. Roesner, Durham, NC (US)

(73) Assignee: V Track ID Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/931,374

(22) Filed: Jun. 28, 2013

(65) Prior Publication Data

US 2015/0006067 A1  Jan. 1, 2015

(51) Int. Cl.

| G06G 7/70 | (2006.01) |
| B60Q 1/00 | (2006.01) |
| H04W 4/00 | (2009.01) |
| H04L 29/08 | (2006.01) |
| H04W 4/02 | (2009.01) |
| H04W 4/04 | (2009.01) |

(52) U.S. Cl.
CPC .............. *H04W 4/008* (2013.01); *H04L 67/12* (2013.01); *H04W 4/02* (2013.01); *H04W 4/027* (2013.01); *H04W 4/046* (2013.01)

(58) Field of Classification Search
USPC ......... 701/118; 340/438–462, 483; 455/422.1
See application file for complete search history.

(56) References Cited

U.S. PATENT DOCUMENTS

| 8,024,084 | B2 * | 9/2011 | Breed .......................... 701/31.4 |
| 8,140,358 | B1 * | 3/2012 | Ling et al. ......................... 705/4 |
| 8,761,992 | B2 * | 6/2014 | Sennett et al. ............... 701/29.1 |
| 8,902,082 | B2 * | 12/2014 | Roesner ....................... 340/928 |
| 2003/0093187 | A1 * | 5/2003 | Walker .............................. 701/1 |
| 2005/0273218 | A1 | 12/2005 | Breed et al. |
| 2006/0229777 | A1 * | 10/2006 | Hudson et al. ................. 701/29 |
| 2007/0149184 | A1 * | 6/2007 | Viegers et al. ............. 455/422.1 |
| 2008/0114502 | A1 | 5/2008 | Breed et al. |
| 2008/0284575 | A1 * | 11/2008 | Breed .......................... 340/438 |
| 2009/0002164 | A1 * | 1/2009 | Brillhart et al. ............ 340/572.1 |
| 2010/0207787 | A1 * | 8/2010 | Catten et al. ................. 340/905 |
| 2012/0209634 | A1 * | 8/2012 | Ling et al. ......................... 705/4 |
| 2012/0323690 | A1 * | 12/2012 | Michael ..................... 705/14.58 |
| 2013/0041574 | A1 | 2/2013 | Koshizen |
| 2013/0088345 | A1 * | 4/2013 | Roesner ....................... 340/438 |

OTHER PUBLICATIONS

Written Opinion and International Search Report issued in International Application No. PCT/US14/44370 on Mar. 10, 2015; 11 pages.
International Preliminary Report on Patentability issued in International Application No. PCT/US2014/044370 on Jul. 2, 2015; 13 pages.

* cited by examiner

*Primary Examiner* — Thomas G Black
*Assistant Examiner* — Tyler Paige
(74) *Attorney, Agent, or Firm* — Fish & Richardson P.C.

(57) ABSTRACT

In some implementations, a method for wirelessly communicating includes receiving, from a transceiver, a message associated with a value for a dynamic attribute of the vehicle. The message associated with the value for the dynamic attribute is wirelessly transmitted by a converter to a wireless device. The converter is connected to the transceiver and an on-board vehicle processor.

29 Claims, 4 Drawing Sheets

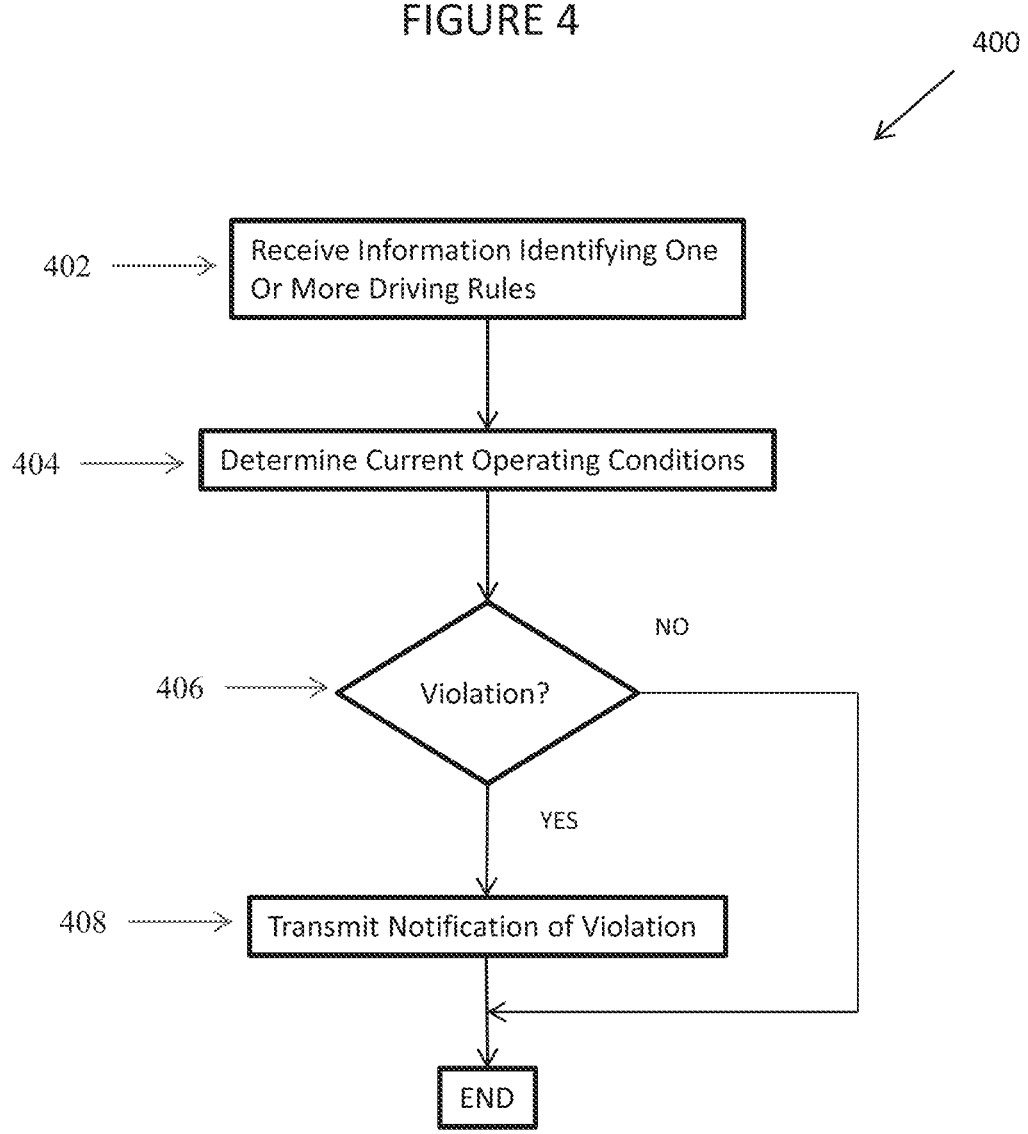

WIRELESSLY COMMUNICATING WITH VEHICLE CONVERTERS

TECHNICAL FIELD

This invention relates to radio frequency signals and, more particularly, to wirelessly communicating vehicle converters.

BACKGROUND

In some cases, an RF reader operates in a dense reader environment, i.e., an area with many readers sharing fewer channels than the number of readers. Each RF reader works to scan its interrogation zone for transponders, reading them when they are found. Because the transponder uses radar cross section (RCS) modulation to backscatter information to the readers, the RFID communications link can be very asymmetric. The readers typically transmit around 1 watt, while only about 0.1 milliwatt or less gets reflected back from the transponder. After propagation losses from the transponder to the reader the receive signal power at the reader can be 1 nanowatt for fully passive transponders, and as low as 1 picowatt for battery assisted transponders. When a low-power signal of narrow frequency bandwidth is received by an RF reader, the signal to noise ratio of the received signal may be very small.

SUMMARY

In some implementations, a method for wirelessly communicating includes receiving, from a transceiver, a message associated with a value for a dynamic attribute of a vehicle. The message associated with the value for the dynamic attribute is wirelessly transmitted by a converter to a wireless device. The converter is connected to the transceiver and an on-board vehicle processor.

The details of one or more implementations of the invention are set forth in the accompanying drawings and the description below. Other features, objects, and advantages of the invention will be apparent from the description and drawings, and from the claims.

DESCRIPTION OF DRAWINGS

FIGS. 2-4 are flowcharts illustrating examples method for communicating information associated with vehicle operating conditions.

DETAILED DESCRIPTION

Figure 1:
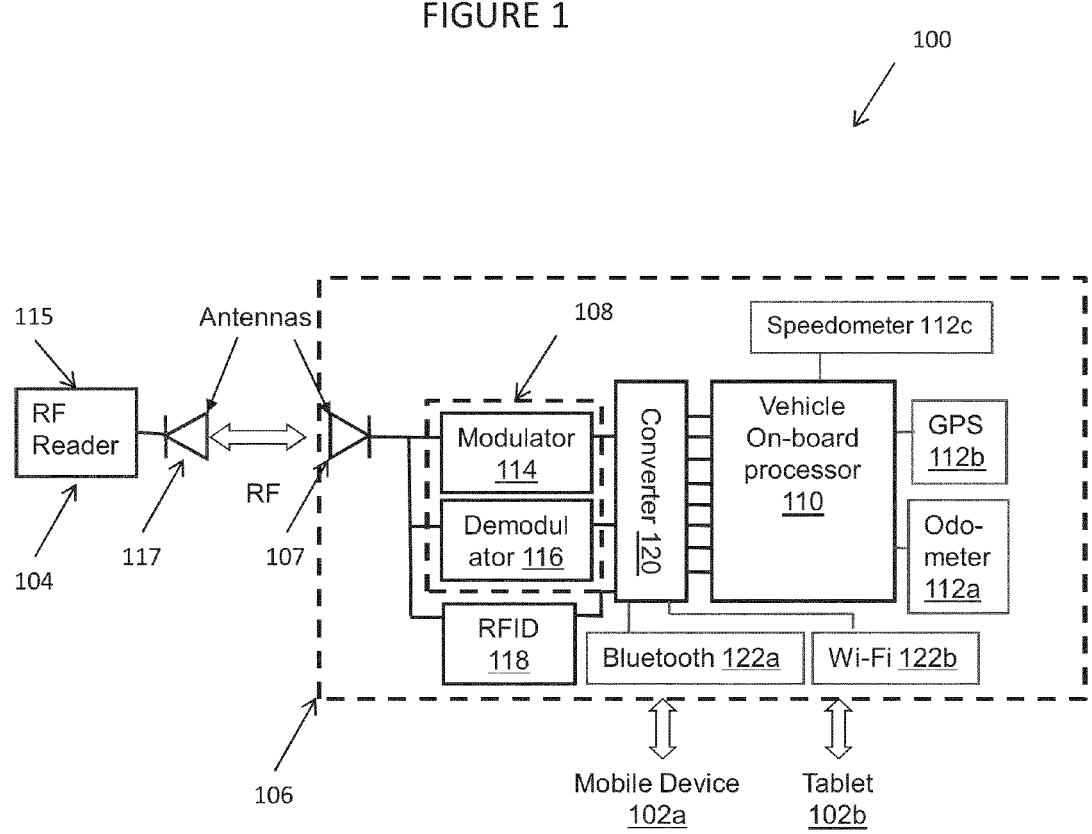
FIG. 1 is a block diagram illustrating an example system for transmitting dynamic attributes of vehicles.

FIG. 1 is a block diagram illustrating an example system 100 for storing information associated with a vehicle for wireless communication to wireless unit. For example, the system 100 may store values of dynamic attributes of a vehicle and associated information from a wireless device associated with the vehicle and may wirelessly transmit the values and the information to a radio frequency (RF) reader in response to a request. Dynamic attributes may include vehicle identification number (VIN), speed, location, mileage, tire pressure, engine status, oil level, engine temperature, battery level, passenger number, or other attributes of a vehicle that may vary over time. The associated information from a wireless device may include a time entry, a schedule, a driving route, driver record, cargo manifest, vehicle owner, expired license, insurance, safety checks, or other information entered into or otherwise stored in the wireless device. In some implementations, a vehicle may include a converter configured to store values of dynamic attributes from an on-board processor and information from one or more wireless devices. In these instances, the converter may be connected to a transceiver configured to communicate with RF readers and configured to receive requests from and transmit responses to RF readers using the transceiver. For example, the converter may be connected to a vehicle transceiver and connected in parallel to both an on-board processor and one or more wireless ports configured to wirelessly communicate with external wireless devices (e.g., cellphone, computer).

In some implementations, the system 100 may store values and information in the converter periodically or in response to an event (e.g., request, start of a vehicle). In some instances, the system 100 may push the values to the converter or the converter may retrieve the values from the on-board processor or external wireless device. In some instances, the converter may transmit a request to the on-board processor or wireless device. For example, the converter may generate a request or receive a request from the vehicle transceiver, determine the communication is destined for a wireless device, and route the communication to a wireless port of the converter. By including wireless ports in a vehicle converter, the system 100 can add a wireless connection to wireless devices in parallel with a hardwired connection to the on-board vehicle processor. This additional path of communication may reduce the latency and system cost while at the same time enhancing system performance. In other words, data communicated between an RF reader and wireless devices is not transmitted through the on-board vehicle processor; however, the system 100 adds one or more wireless interfaces to the convertor.

At a high level, the system 100 includes user devices 102*a* and 102*b* and a roadside unit 104 communicably coupled with vehicle 106 through wireless connections. The roadside unit 104 includes an RF reader 115 and antenna 117. The vehicle 106 includes an antenna 107, a transceiver 108 and on-board vehicle processor 110 connected through a converter 120, and status modules 112*a-c*. The transceiver 108 includes a modulator 114 and a demodulator 116. In addition, the vehicle 106 includes an RFID module 118 connected in parallel to the transceiver 108 between the antenna 107 and the converter 120. The converter 120 includes wireless interfaces 122*a* and 122*b* for wirelessly communicating with the wireless devices 102*a* and 102*b*. In some aspects of operation, the converter 120 receives values from the on-board vehicle processor 110 and stores the values. In addition, the converter 120 may receive information from at least one of the user devices 102*a* or 102*b* and stores the information. The transceiver 108 may receive a wireless request from the roadside unit 104 for a value of a dynamic attribute of the vehicle 106 or information associated with the user device 102, convert the request to baseband using the demodulator 116, and route the signal to the converter 102. In response, the converter 102 may retrieve the current value from one of the status modules 112*a-c* or the information associated with the user device 102 and may pass a response including the value or information to the modulator 114. The modulator 114 modulates the signal including the value or information and transmits the response the roadside unit 104. If the value and/or information satisfies or violates predefined criteria, the roadside unit 104 may transmit a notification to the vehicle 106 destined for a wireless device 102 or to a third party. If the notification is transmitted to the vehicle 106, the demodulator 116 demodulates the received notification to baseband and passes the notification to the converter 120. The converter 120 determines the notification is destined for a wireless device 102 and passes the notification to a wireless port 122 for wireless transmission to the wireless device 102. The wireless device 102 presents the notification to the user.

Turning to a more detailed description of the elements, the RF reader 115 can include any software, hardware, and/or firmware configured to transmit and receive RF signals. In some implementations, the RF reader 115 can determine values for dynamic attributes of the vehicle 106 based on received wireless signals. The RF reader 115 may transmit requests for information within an interrogation zone associated with the roadside unit 104. The reader 115 may transmit the query in response to a request, automatically, in response to a threshold being satisfied (e.g., expiration of time), as well as others events. The interrogation zone may be based on one or more parameters such as transmission power, associated protocol, nearby impediments (e.g., objects, walls, buildings), as well as others. In some implementations, the RF reader 115 may transmit multiple requests for information to the vehicle 106 to determine current attributes. For example, the RF reader 115 may determine or otherwise identify a speed of the vehicle 106 based on a received signal encoding the speed.

In some implementations, the RF reader 115 may include a controller, a transceiver coupled to the controller, and an RF antenna 117 coupled to the transceiver. For example, the RF antenna 117 may transmit commands generated by the controller and receive responses from the vehicle 106. In certain cases such as tag-talks-first (TTF) systems, the reader 115 may not transmit commands but only RF energy. In some implementations, the controller can determine statistical data and/or position data based, at least in part, on tag responses. The reader 115 often includes a power supply or may obtain power from a coupled source for powering included elements and transmitting signals. In some implementations, the reader 115 operates in one or more of frequency bands allotted for RF communication. For example, the Federal Communication Commission (FCC) have assigned 902-928 MHz and 2400-2483.5 MHz as frequency bands for certain RFID applications. In some implementations, the reader 115 may dynamically switch between different frequency bands. The reader 115 can, in some implementations, include three or more antennas 114 in any geometric configuration that allows triangulation based, at least in part, on TDOA. In some implementations, the antennas 114 may be selectively positioned to optimize, enhance, or otherwise increase precision and/or accuracy of position tracking. In pulse compressing backscattered signals, the reader 115 may receive that backscattered signal, a wide bandwidth signal, and compress the pulse using a long time duration match filter, a correlation receiver and/or other module to achieve substantial processing gain. For example, the reader 115 may achieve a factor of 60 dB processing gain, which may translate to lower radiated power requirements from the transponder. In some implementations, the reader 115 can determine the pulse-compressed signal based, at least in part, on the backscattered spread-spectrum signal from the tag 102. For example, the reader 115 may store or otherwise identify the pseudorandom sequence used by the tag 102 to determine the pulse-compressed signal.

In some implementations, the reader 115 may transmit a modulated RF signal polling command to the local on-board transceiver 108 installed in the vehicle or other object. The reader 115 transmits a modulated RF signal using the antenna 117. Though, the reader 115 may use any suitable formats and/or protocols without departing from the scope of this disclosure. For example, the reader 115 may transmit a simple amplitude modulation (AM) to simplify and reduce the cost of the on-board transceiver 108. The reader 115 may also receive a return signal from the on-board transceiver 108. Many types of commercial readers already exist including those used in radio frequency identification (RFID), Bluetooth, cell phones, etc. Frequencies may be in a range from about 433 MHz to about 5.9 GHz. The selection criteria may include such factors as read distances, baud rates, costs, etc.

In some implementations, the reader 115 includes any software, hardware, or firmware configured to determine whether one or values of dynamic attributes and associated information violate one or more driving rules. A driving rule may include a county law, a state law, a federal law, an enterprise law (e.g., company law), or others. For example, the law may be a speed limit, weight limit, a limit on vehicle operating condition (e.g., gas mileage, exhaust) or others. In some implementations, the reader 115 determine that the one or values of dynamic attributes and the associated information does not match and, in response to the violation, transmit a notification to the vehicle 106 or a third party (e.g., law enforcement). In these instances, a truck driver of the vehicle may provide associated information through an application on the wireless device 102 such as the daily driving record. The reader 115 may receive this information and active driving data (dynamic information) of the vehicle 106 from the converter 120. If the driver indicates that they have only been driving for 2 hours out of the previous 8 hours but the driving data indicates that the truck has been driven for 6 hours, the reader 115 determines a conflict and a notification may be transmitted to the driver and/or authorities. For example, if the vehicle 106 is a truck, the reader 115 may receive the vehicle weight from the vehicle 106 and determine the indicated weight does not match the weight at a weigh station. In these instances, the reader 115 may transmit the violation to the proper authorities. In some implementations, the reader 115 may receive a warning associated with driving conditions and transmit the warning via the vehicle 106 to a user device 102. For example, the warning may identify traffic congestion, an accident, a current speed limit, or other conditions or parameters.

The vehicle 106 can include any vehicle for transporting at least one of people or objects such as automobiles, vans, buses, snowmobiles, all-terrain vehicles, Segways, or other such devices. In the illustrated implementation, vehicle 106 includes the onboard processor 110. The processor 110 can include any hardware, software, and/or firmware operable to receive values for dynamic attributes from the sensors 112a-c and pass information identifying the values to the transceiver 108 for wireless transmission. As previously mentioned, the status modules 112a-c may determine information such as speed, mileage, fuel tank level, location based on, for example, Global Position System (GPS), collision information, or any other suitable information associated with the vehicle 106. The processor 110 may retrieve or otherwise receive the speed of the vehicle 106 from the speedometer 112c. Similarly, the processor 110 may transmit requests to or otherwise receive information from other modules 112 associated with vehicle 106 such as the odometer 112a, GPS 112b, collision sensors (e.g., accelerometers), or others. Processor 110 may periodically retrieve values for dynamic attributes and/or retrieve the values for dynamic attributes in response to an event. For example, processor 110 may retrieve values for dynamic attributes in response to a request from the roadside unit 104, expiration of a timer, motion sensors, and/or any other suitable event. Upon receiving of the values for dynamic attributes, the processor 110 may overwrite previous values or merge the current values with previously stored information. After gathering values for dynamic attributes, the processor 110 may wirelessly transmit one or more values to the roadside unit 104 using the transceiver 108. The transmission of the values for dynamic attributes may be periodic and/or in response to an event.

As illustrated, the vehicle 106 includes an RFID module 118 connected in parallel with the transceiver 108. For example, the system 100 may have the ability to operate an RFID tag 118 in parallel with the vehicle's transceiver 108. There is market pressure to attach RFID tags to vehicles for both electronic toll collection (ETC) and electronic vehicle registration (EVR) for identification purposes. By placing an RFID module 118 in parallel with the transceiver 108, this configuration may allow the roadside unit 104 to communicate with both the onboard processor 110 and the RFID tag 118. The RFID chip (integrated circuit portion of the RFID module 118) may have an internal modulator and demodulator.

In some implementations, the RFID module 118 can include any software, hardware, and/or firmware configured to respond to communication from the RF reader 115. The module 118 may operate without the use of an internal power supply. Rather, the module 118 may transmit a reply using power stored from the previously received RF signals, independent of an internal power source. This mode of operation is typically referred to as backscattering. In some implementations, the module 118 may alternate between absorbing power from signals transmitted by the RF reader 115 and transmitting responses to the signals using at least a portion of the absorbed power. In passive tag operation, the module 118 typically has a maximum allowable time to maintain at least a minimum DC voltage level. In some implementations, this time duration is determined by the amount of power available from an antenna of a module 118 minus the power consumed by the module 118 and the size of the on-chip capacitance. The effective capacitance can, in some implementations, be configured to store sufficient power to support the internal DC voltage when there is no received RF power available via the antenna. The module 118 may consume the stored power when information is either transmitted to the module 118 or the module 118 responds to the RF reader 115 (e.g., modulated signal on the antenna input). In transmitting responses back to the RF reader 115, the module 118 may include one or more of the following: an identification string, locally stored data, tag status, internal temperature, and/or others. For example, the module 118 may transmit information including or otherwise identifying vehicle information such as type, weight, vehicle height, tag height, account number, owner information (e.g., name, license number), and/or other information. In some implementations, the signals can be based, at least in part, on sinusoids having frequencies in the range of 902-928 MHz or 2400-2483.5 MHz. As illustrated, the RFID module 118 is also directly connected to the processor 110. In these instances, the RFID integrated module 118 may include data Input/Output (I/O) ports. Using these ports, the module 118 may directly communicate with the vehicle's processor 110. In some implementations, the transceiver 108 may be removed such that the reader 115 only communicates with the processor 110 using the RFID module 118.

The convertor 120 includes any software, hardware, or firmware for converting between serial data and parallel data and storing values from the on-board processor 110 and information from external wireless devices 102a and 102b. In regard to conversions, the processor 110 may include a parallel input so serial data from the demodulator 116 may be converted to the parallel input of the processor 110. In these instances, the convertor 120 may include multiple lines 504 for the data in parallel format, which enables sharing data between the convertor 120 and the processor 110. This convertor 120 may also have the ability to convert the processor's parallel output data to serial data that can be transmitted via the modulator 114 to the roadside unit 104.

In regard to storage, the converter 120 may receive values of dynamic attributes from the processor 110 and information from external wireless devices 102a and 102b and store the values and information. In order to communicate with the external wireless devices 102a and 102b, the converter 120 includes wireless ports 112a and 112b. While the wireless ports 112a and 112b are Bluetooth® and WiFi ports, respectively, the wireless port 112a or 112b may be other types of ports without departing from the scope of the disclosure. In addition, the converter 120 may include one or multiple ports without departing from the scope of the disclosure. By having at least one wireless port 112, information from the external wireless device 102 does not need to be passed through the vehicles processor 110 and instead allows for direct communication to these devices 102 via the convertor 120. Previous designs include a long time delay (e.g., 50 to 100 milliseconds) when communicating with the wireless device through the converter 120 because the communication was routed through the vehicle processor 110. Vehicles traveling at high speeds passing a reader in the previous design would not have sufficient time to collect data retrieved via the vehicle processor's Bluetooth interface due to the vehicle bus latency. The new technology allows for direct and substantially instantaneous communication with the attached wireless devices 102a and 102b. Additionally, information available within the convertor 120 extracted from either the RFT reader 102 or the vehicle on-board processor 110 can be transmitted via the wireless networks. In some implementations, the converter 120 may receive values and information prior to a request from the RF unit 104. In some examples, the on-board vehicle processor 110 or the wireless device 102 may push values to the converter 120 or transmit values in response to an event (e.g., request from the converter 120, expiration of time). In some examples, the converter 120 may transmit requests to the on-board vehicle processor 110 or the external wireless devices 102a or 102b. Regardless, the converter 120 may store values of dynamic attributes and information from external wireless devices 102a and 102b.

In some implementations, the converter 120 can be configured to determine a driver is violating one or more driving laws or company policies. For example, the converter 120 may receive the current speed limit from the reader 115 and determine the current speed violates the current speed limit. In response to the violation, the converter 120 may wireless transmit a warning to the external device 102 indicating the speed violation. Alternatively or in combination, the converter 120 may store information associated with the violation such as the time, location, drive, speed, speed limit, and/or other information.

In some aspects of operation, the RF reader 115 can communicate with the wireless devices 102a or 102b through the wireless port 112a or 112b. For example, after determining that that the vehicle 106 is traveling in excess of the speed limit, the RF reader 115 may transmit a message to the wireless device 102 to notify the driver that they are driving beyond the speed limit. The notification may be at least one of an audio message, visual message, a tactile message (e.g., vibration), or others.

Figure 2:
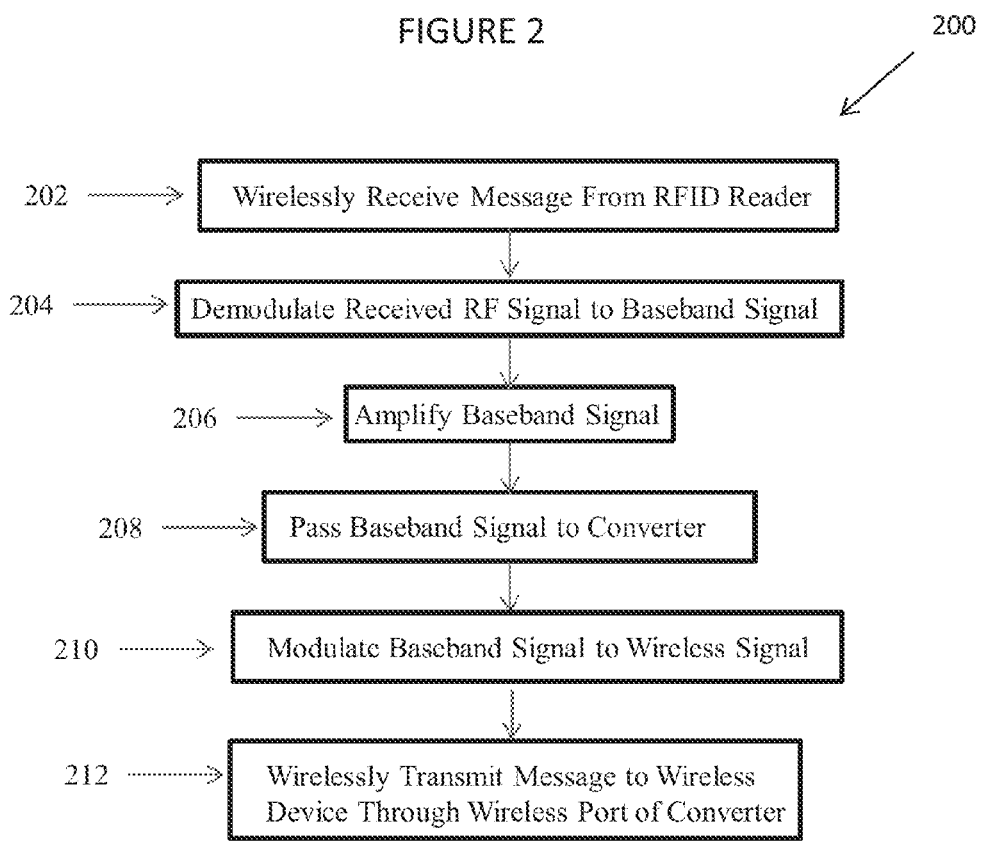
Figure 3:
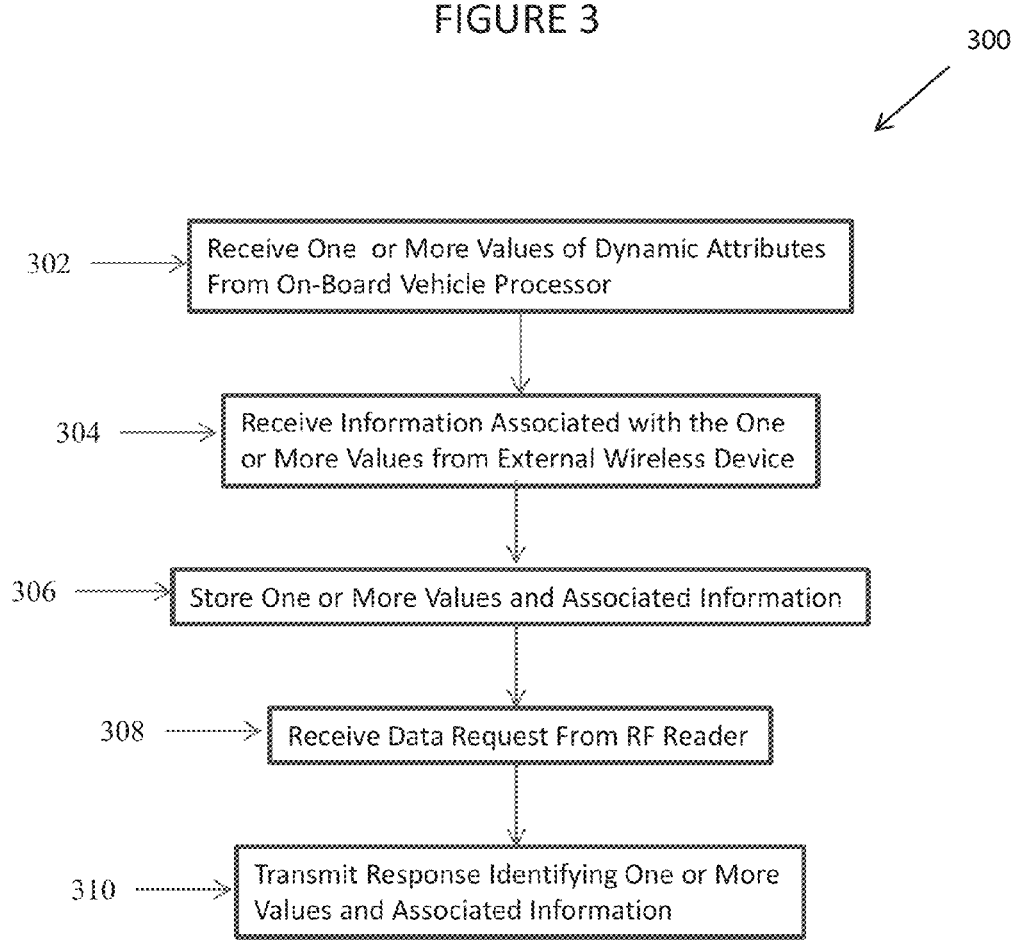

FIGS. 2-4 are flowcharts illustrating example methods 200-400 for associated with communication between an RF reader and a vehicle. In particular, method 200 includes an RF reader communicating through a wireless port of a converter. Method 300 includes storing one or more values of dynamic attributes from an on-board vehicle processor and associated information from an external wireless device. Method 400 includes determining whether current operating conditions violate one or more driving rules. These methods are for illustration purposes only and that the described or similar techniques may be performed at any appropriate time, including concurrently, individually, or in combination. In addition, many of the steps in the flowcharts may take place simultaneously and/or in different orders than as shown. Moreover, systems may use methods with additional steps, fewer steps, and/or different steps, so long as the methods remain appropriate.

In regard to FIG. 2, method 200 begins at step 202 where a message from the RF reader is wirelessly received. For example, the RF reader 115 may transmit a message to the vehicle 106 (e.g., driver notification). The received RF signal is demodulated to a baseband signal at step 204. As for the example, the demodulator 116 may receive the RF signal from the antenna 107 and demodulate the RF signal to a baseband signal. At step 206, the baseband signal may be amplified. Next, at step 208, the baseband signal is passed to a converter with wireless ports. For example, the converter 120 may determine that the baseband signal is destined for a wireless device with a specific interface type. At step 210, the converter modulates the baseband signal to a wireless signal. The message is wirelessly transmit, at step 212, to a wireless device through the wireless port of the converter.

In regard to FIG. 3, method 300 begins at step 302 where one or more values of a dynamic attribute is received from an on-board processor. For example, the converter 120 in FIG. 1 may receive one or more values from the on-board vehicle processor 110. At step 204, information associated with the one or more values is received from an external wireless device. In the example, the wireless device 102*a* may transmit information associated with one or more values of dynamic attributes to the converter 120 through the wireless port 122*a*. Next, at step 306, the one or more values and the associated information is stored. As for the example, the converter 102 may store the one or more values and the associated information for future request from, for example, RF unit 104. At step 308, a request for data is received from an RF reader. Again returning to the example, the RF unit 104 may transmit a request for information to the converter 120 through the transceiver 108. A response identifying the one or more values and the associated information is transmitted to the RF reader. In the example, the converter 108 may transmit a response identifying the one or more values and the associated information to the modulator 114 and the modulator 114 may modulate an RF signal including the response for the RF unit 104.

In FIG. 4, method 400 begins at step 402 where information identifying one or more driving rules is received. In some examples, in FIG. 1, the reader 115 or another device may transmit one or more driving rules to the converter 120, which stores the rules. In some examples, the reader 115 may receive the driving rules via a network. At step 404, the current operating conditions of the vehicle are determined. In some examples, the converter 120 may determine the current operating conditions from the stored values or may receive them from one or more status modules 112. In some examples, the converter 120 may wirelessly transmit the one or more current operating conditions to the reader 115. At decisional step 406, whether the current operating conditions violate the one or more driving rules is determined. In some implementations, the reader 115 or the converter 120 may determine whether a violation occurs. In some instances, the reader 115 may compare one or more driving rules received from a network to the current operating conditions. In some instances, the reader 115 may transmit one or more driving rules to the converter 120, and the converter 120 determines whether a violation occurs. If a violation does occur at decisional step 406, then, at step 408, a notification is transmitted identifying the violation. Returning to the example, the reader 115 may transmit a notification to the vehicle 106 or external device 102 via the vehicle or to a third party through a network (e.g., cellular network, Internet). In some implementations, the converter 120 may wireless transmit the notification to the external device 102 or to the reader 115 using the transceiver 108.

What is claimed is:

1. A system for wirelessly communicating with a processor of a vehicle, comprising:
    a converter connected to an on-board vehicle processor and a transceiver, configured to convert between serial data and parallel data, and including a wireless port configured to communicate with mobile devices in the vehicle, wherein the on-board vehicle processor is connected to a status module in a vehicle and configured to receive, from the status module, a value for a dynamic attribute of the vehicle;
    an antenna;
    the transceiver connected to the antenna and the converter and configured to wirelessly communicate with radio frequency (RF) readers; and
    an RFID module connected to the antenna in parallel with the transceiver and configured to wirelessly communicate with the RFID readers.

2. The system of claim 1, wherein the wireless port comprises a Bluetooth® port or Wi-Fi® port.

3. The system of claim 1, wherein the transceiver comprises:
    a demodulator configured to demodulate the received signal; and
    an amplifier connected to the demodulator and configured to amplify the wirelessly communications.

4. The system of claim 1, wherein the status module includes a sensor configured to detect the value for the dynamic attribute.

5. The system of claim 4, wherein the sensor comprises at least one of an odometer, a Global Positioning System (GPS), or a speedometer.

6. The system of claim 1, the converter further configured to convert between serial data and parallel data.

7. The system of claim 1, wherein the transceiver includes a plurality of antennas each of the antennas configured to communicate using a different frequency.

8. The system of claim 1, further comprising an RFID module connected to the antenna in parallel with the transceiver and configured to wirelessly communicate with RF readers.

9. The system of claim 1, wherein the messages comprise a notification of one or more conditions for a user of the vehicle.

10. The system of claim 9, wherein the notification indicates that the value for the dynamic attribute violates one or more criteria.

11. The system of claim 10, wherein the notification comprises at least one of an audio notification or a visual notification.

12. The system of claim 9, wherein the notification comprises a warning of traffic congestion or accident, and the converter further configured to wirelessly transmit the warning of the traffic congestion or the accident to an external user device.

13. The system of claim 9, wherein the notification comprises information identifying a current speed limit, the converter further configured to:
   determine a current speed of the vehicle violates the current speed limit; and
   wireless transmit a warning to an external user device that the current speed violates the current speed limit.

14. The system of claim 9, wherein the notification comprises information identifying a current speed limit, the converter further configured to:
   determine a current speed of the vehicle violates the current speed limit; and
   store in a log information identifying at least one of a time, a location, a driver, the current speed, or the current speed limit.

15. A method for wirelessly communicating with a processor of a vehicle, comprising:
   receiving, from an on-board vehicle processor connected to a status module and a transceiver, a value of a dynamic attribute of the vehicle and information associated with the value for the dynamic attribute from an external wireless device;
   storing the value and the information;
   receiving, from an RF reader, a request associated with the value for the dynamic attribute of the vehicle;
   converting from parallel data to serial data prior to wirelessly transmitting the value for the dynamic attribute;
   wirelessly transmitting, to the RF reader, by the transceiver in the vehicle, a response identifying the value for the dynamic attribute and the associated information; and
   wirelessly communicating, by an RFID module in the vehicle, with the RFID reader.

16. The method of claim 15, wherein the message is transmitted through a Bluetooth® port or Wi-Fi® port.

17. The method of claim 16, further comprising:
   wirelessly receiving an RF signal from an RF reader;
   demodulating the received signal to a baseband signal; and
   amplifying the baseband signal.

18. The method of claim 15, wherein the value comprises a signal from a sensor included in the vehicle.

19. The method of claim 18, wherein the sensor comprises at least one of an odometer, a Global Positioning System (GPS), or a speedometer.

20. The method of claim 15, wherein the message comprises a notification of one or more conditions for a user of the vehicle.

21. The method of claim 20, wherein the notification indicates that the value for the dynamic attribute violates one or more criteria, the method further comprising automatically notifying the user in response to at least the violation.

22. The method of claim 21, wherein the notification comprises at least one of an audio notification or a visual notification.

23. The method of claim 20, wherein the notification comprises a warning of traffic congestion or accident, and the method further comprising wireless transmitting the warning of the traffic congestion or the accident to an external user device.

24. The method of claim 20, wherein the notification comprises information identifying a current speed limit, the method further comprising:
   determining a current speed of the vehicle violates the current speed limit; and
   wireless transmitting a warning to an external user device that the current speed violates the current speed limit.

25. The method of claim 20, wherein the notification comprises information identifying a current speed limit, the method further comprising:
   determining a current speed of the vehicle violates the current speed limit; and
   storing in a log information identifying at least one of a time, a location, a driver, the current speed, or the current speed limit.

26. A method, comprising:
   wirelessly receiving one or more driving rules associated with a current location;
   transmitting a request for one or more values of dynamic attributes and associated information to a vehicle;
   receiving a response identifying the one or more values and the associated information;
   determining the one or more values and the associated information violate the one or more driving rules; and
   in response to the determining, transmitting a notification of the violation.

27. The method of claim 26, wherein the notification is transmitted to the vehicle or a third party.

28. The method of claim 27, wherein the notification is transmitted to the vehicle for presentation through an external user device and comprises a warning of traffic congestion or accident.

29. The method of claim 27, wherein the notification is transmitted to the vehicle for presentation through an external user device and comprises information identifying a current speed limit.

* * * * *